(12) United States Patent
Fangmann et al.

(10) Patent No.: US 6,375,396 B1
(45) Date of Patent: Apr. 23, 2002

(54) HOLE CUTTING TOOL WITH DRILL PILOT

(75) Inventors: Michael D. Fangmann, Blue Grass; William C. McKay, Davenport, both of IA (US); Robert E. Strange, Marco Island, FL (US)

(73) Assignee: Jancy Engineering Company, Davenport, IA (US)

( * ) Notice: Subject to any disclaimer, the term of this patent is extended or adjusted under 35 U.S.C. 154(b) by 0 days.

(21) Appl. No.: 09/534,606

(22) Filed: Mar. 27, 2000

(51) Int. Cl.[7] ............................................... B23B 51/04
(52) U.S. Cl. ....................... 408/206; 408/204; 408/209; 408/57
(58) Field of Search ................................ 408/207, 209, 408/204, 206, 57, 59, 226, 68

(56) References Cited

U.S. PATENT DOCUMENTS

| | | | | |
|---|---|---|---|---|
| 3,825,362 A | * | 7/1974 | Hougen | 408/68 |
| 4,385,853 A | * | 5/1983 | Strange et al. | 408/68 |
| 4,408,935 A | | 10/1983 | Miyanaga | 408/206 |
| 4,624,608 A | * | 11/1986 | Shiomi et al. | 408/56 |
| 5,062,748 A | * | 11/1991 | Kishida | 408/206 |
| 5,240,357 A | * | 8/1993 | Omi | 408/204 |
| 5,281,060 A | * | 1/1994 | Strange et al. | 408/204 |
| 5,316,418 A | * | 5/1994 | Miyanaga | 408/201 |

* cited by examiner

Primary Examiner—Daniel W. Howell
Assistant Examiner—Terrence Washington
(74) Attorney, Agent, or Firm—Charles W. Chandler

(57) ABSTRACT

A rotary cutting tool has an axially moveable drill pilot supported in the forward end of an arbor. A first set screw connects the arbor to an annular hole cutter. A second set screw connects the arbor to the drill pilot. The drill pilot has an integral collar that engages the inner end of the hole cutter to prevent the drill pilot from being ejected from the arbor in the event that the second set screw is disengaged from the drill pilot.

6 Claims, 2 Drawing Sheets

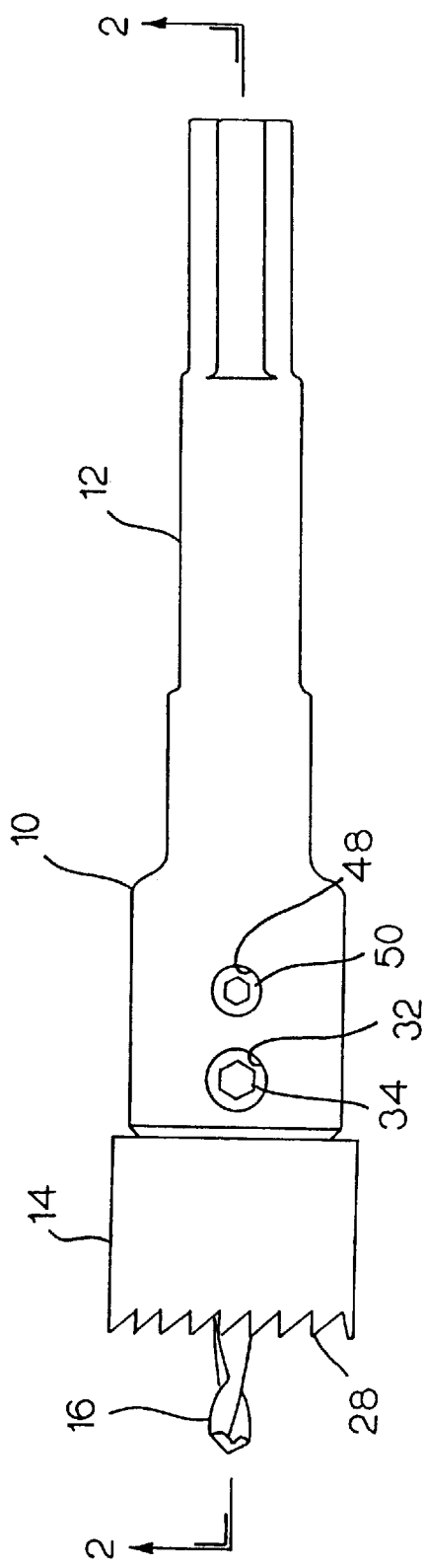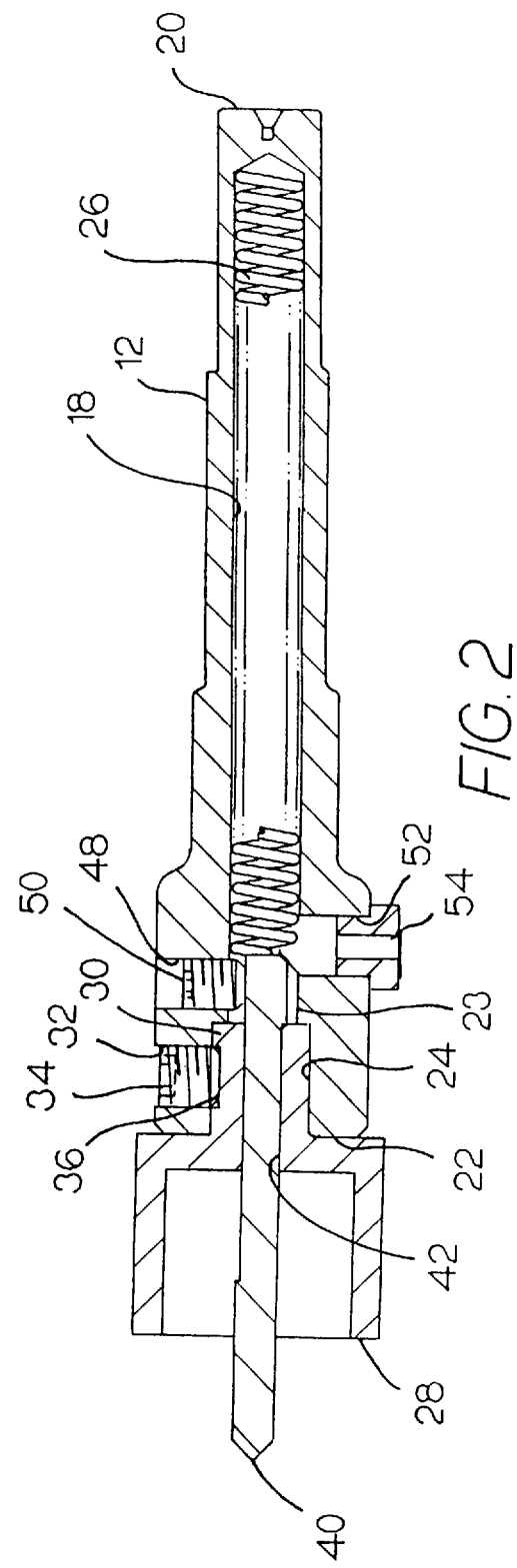

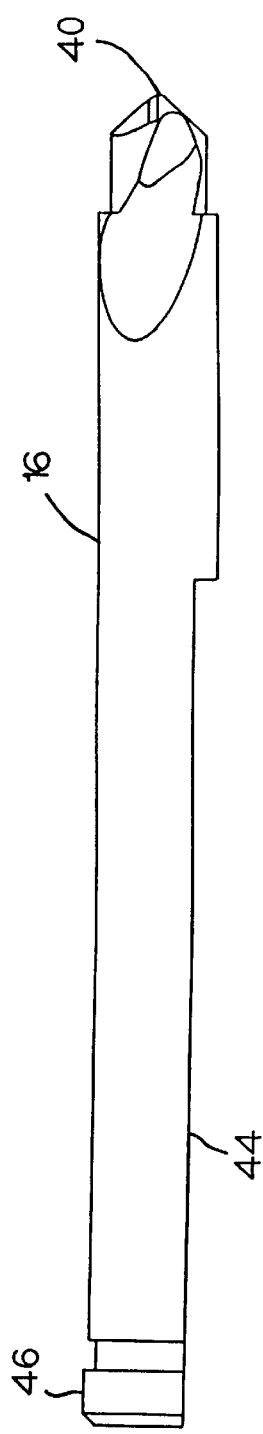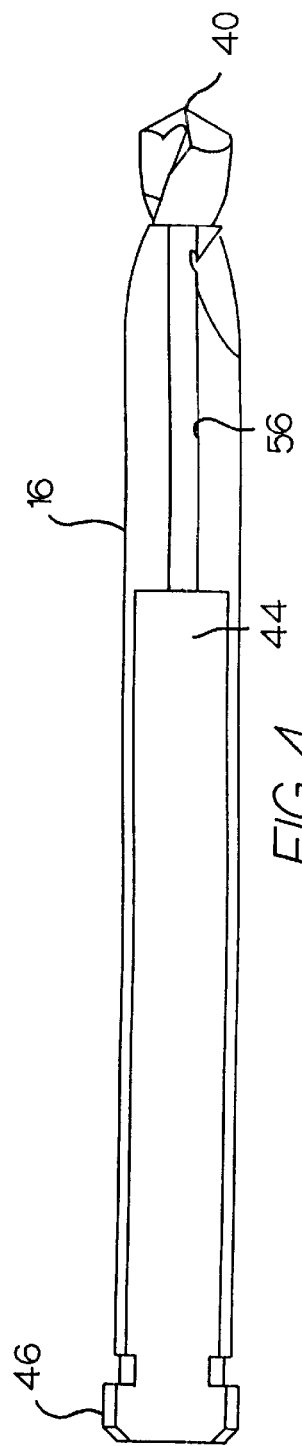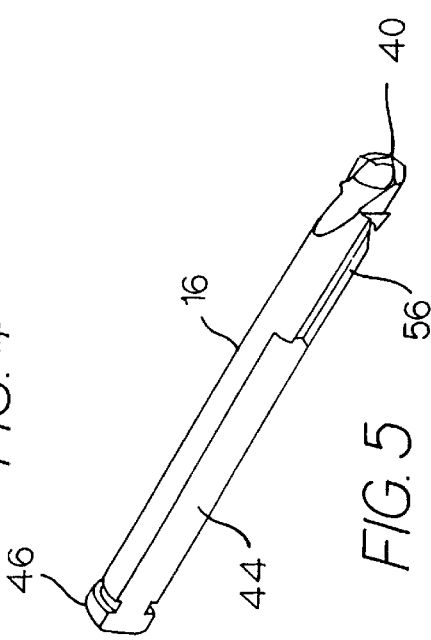

HOLE CUTTING TOOL WITH DRILL PILOT

BACKGROUND AND SUMMARY OF THE INVENTION

Annular hole cutting tools typically have an arbor connected to an annular, hollow cutter for cutting a hole in a workpiece. A pointed ejector member, or pilot drill, is mounted in the cutter. As the rotating arbor is advanced toward the workpiece, the drill drills a pilot hole into the workpiece to center the annular cutter.

A similar device is illustrated in U.S Pat. No. 4,408,935 issued Oct. 11, 1983 to Masaaki Miyanaga for "Metal Borer". A set screw on the spindle engages a groove in the ejector to prevent it from being totally ejected from the spindle. If the set screw is removed from the groove, a spring will tend to totally eject the pointed ejector member from the arbor, creating a dangerous situation.

The broad purpose of the present invention is to provide an arbor assembly for supporting both a hole cutter and a spring-biased drill pilot. A set screw connects the arbor to the hole cutter so that they rotate as a unit. A second set screw on the arbor engages a longitudinal flat surface on the drill pilot to permit it to move axially with respect to the hole cutter, while rotating with the arbor. The inner end of the drill pilot has a collar that is larger than the diameter of the center bore of the hole cutter so that the drill pilot cannot pass through the hole cutter in the event the second set screw is disengaged from the flat on the drill pilot.

Still further objects and advantages of the invention will become readily apparent to those skilled in the art to which the invention pertains upon reference to the following detailed description.

DESCRIPTION OF THE DRAWINGS

FIG. 1 is a view of a hole cutting tool illustrating the preferred embodiment of the invention;

FIG. 2 is a longitudinal sectional view of the preferred hole cutter as seen along lines 2—2 of FIG. 1:

FIG. 3 is an enlarged view of the drill pilot;

FIG. 4 is a view as seen from the bottom of FIG. 3; and

FIG. 5 is a perspective view of the drill pilot.

DESCRIPTION OF THE PREFERRED EMBODIMENT

Referring to the drawings, FIG. 1 illustrates a preferred hole cutting tool 10 which comprises an elongated arbor 12, a hollow hole cutter 14, and a drill is pilot 16. Arbor 12 is formed of a suitable steel and has an axial center bore 18, which extends from a rear end 20 to a forward end 22. Bore 18 has an enlarged diameter at 23 and a larger diameter at 24. Arbor 12 is shaped to be engaged and rotated by a driver means, not shown.

An elongated spring 26 is mounted in bore 18 and has a length such that its inner end abuts the rear end of base 18. The forward end of the spring extends adjacent that portion of the bore having diameter 23.

Hole cutter 14 has an annular array of cutting teeth 28 for cutting a hole as the arbor and cutter are rotated. The cutter has a sleeve 30 that is slidably received in that portion of the arbor bore having diameter 24. The arbor has a threaded fastener opening 32 for receiving a set screw 34. Set screw 34 is threadably received in opening 32 and engages a radial notch 36 in the cutter sleeve so that the arbor and the cutter rotate as a unit.

The drill pilot has a pointed fluted drilling end 40 and an inner end that extends through axial bore 42 of the cutter sleeve. Drill pilot 16 is axially slidably moveable with respect to the cutter. The rear end of the drill pilot engages spring 26, which biases the drill pilot outwardly away from cutting teeth 28 of the cutter. The drill pilot is movable inwardly against the bias of the spring to drill a pilot hole in a workpiece, to a position in which pointed end 40 is adjacent cutting teeth 28.

The drill pilot has an longitudinally running flat surface 44 that extends about two-thirds along the length of the drill pilot from the rear end of the drill pilot. The rear end of the drill pilot has an integral collar 46. Collar 46 has a diameter that is greater than the diameter of the axial bore 42 of the cutter sleeve and abuts the inner end of the cutter sleeve. The collar has a lesser diameter than diameter 33 of the arbor axial bore so that the drill pilot can move axially and rearwardly away from the cutter sleeve as the arbor and the cutter are advanced toward a workpiece.

Referring to FIG. 2, the arbor has a second tapped opening 48 for receiving a set screw 50. Set screw 50 is threadably inserted into tapped opening 48 until it slidably engages flat surface 44 of the drill pilot thereby causing the drill pilot to rotate with the arbor, but also permitting the drill pilot to be axially moveable with respect to the arbor and the cutter. Upon completion of a hole cut in the workpiece, the drill pilot will eject the slug from the hole.

The arbor also has a third opening 52 for receiving an oiler fitting 54 for introducing oil into the arbor axial bore and along an axial groove 56 on the drill pilot to the cutting point of the drill pilot.

Having described our invention, we claim:

1. A hole cutting tool, comprising an elongated arbor having a forward end, a rear end shaped to be engaged and rotated by a driver means, and an axial center bore extending from said forward end toward the rear end thereof; an annular cutter having a sleeve slidably receivable in the forward end of the center bore of the arbor, the cutter sleeve having an axial bore aligned with the center bore of the arbor, the cutter having an annular array of cutting teeth disposed beyond the forward end of the arbor; a pointed drill pilot telescopically slidably engaged with the axial bore of the cutter, the drill pilot having a front portion thereof extendable forward of the cutting teeth of the cutter, and a rear end thereof disposed in the center bore of the arbor rearward of the cutter sleeve;

the drill pilot having a longitudinally running flat surface;

a spring supported in the center bore of the arbor for engaging and urging the drill pilot forwardly toward an extended position;

a first fastener member threadably mounted on the arbor for engaging the cutter sleeve such that the cutter and the arbor rotate as a unit;

a second fastener member threadably, mounted on the arbor for engaging the flat surface of the drill pilot rearwardly of the cutter sleeve such that the drill pilot is axially movable with respect to the cutter;

the drill pilot having a radial enlargement (46) adjacent the rear end thereof; the radial enlargement being larger than the diameter of the axial bore of the cutter but smaller than the diameter of the arbor center bore so that it is moveable toward an extreme forward position such that when the second fastener member is not engaged with the longitudinally running flat surface the radial enlargement the drill pilot abuts the cutter sleeve and prevents removal of the drill pilot from the arbor unless the cutter is removed from the center bore of the arbor.

2. In a hole cutting tool, comprising an elongated arbor having a forward end, a rear end shaped to be engaged and rotated by a driver means, and an axial center bore extending from said forward end toward the rear end thereof; an annular cutter having a sleeve slidably receivable in the forward end of the center bore of the arbor, the cutter sleeve having an axial bore aligned with the center bore of the arbor, the cutter having an annular array of cutting teeth disposed beyond the forward end of the arbor; a pointed drill pilot telescopically slidably engaged with the axial bore of the cutter, the drill pilot having a front portion thereof extendable forward of the cutting teeth of the cutter, and a rear end thereof disposed in the center bore of the arbor rearward of the cutter sleeve; the drill pilot having a longitudinally running flat surface; a spring supported in the center bore of the arbor for engaging and urging the drill pilot forwardly toward an extended position; a first fastener member threadably mounted on the arbor for engaging the cutter sleeve such that the cutter and the arbor rotate as a unit; a second fastener member threadably mounted on the arbor for engaging the flat surface of the drill pilot rearwardly of the cutter sleeve such that the drill pilot is axially movable with respect to the cutter;

the improvement comprising:

the drill pilot having a radial enlargement (46) adjacent the rear end thereof, the radial enlargement being larger than the diameter of the axial bore of the cutter but smaller than the diameter of the arbor center bore so that it is moveable toward an extreme forward position such that when the second fastener member is not engaged with the longitudinally running flat surface, the radial enlargement of the drill pilot abuts the cutter sleeve and prevents removal of the drill pilot from the arbor unless the cutter is removed from the center bore of the arbor.

3. A hole cutting tool as defined in claim 1, in which the sleeve of the cutter has a notch for engaging said fastener means.

4. A hole cutting tool as defined in claim 1, in which the drill pilot functions as an ejector member.

5. A hole cutting tool as defined in claim 1, in which the fastener means engages the cutter sleeve.

6. A hole cutting tool as defined in claim 1, in which the drill pilot has an longitudinal groove for passing a cutting fluid toward the pointed end of the drill pilot.

* * * * *